United States Patent [19]

Kawai et al.

[11] Patent Number: 5,950,039
[45] Date of Patent: Sep. 7, 1999

[54] IMAGE FORMING APPARATUS HAVING CIRCUITS FOR ADJUSTING LIGHT BEAM INTENSITY AND DIAMETER

[75] Inventors: Naotoshi Kawai, Aichi-Ken; Toshikazu Kawaguchi, Kobe; Shigeru Sawada; Hiroshi Hiraguchi, both of Toyokawa, all of Japan

[73] Assignee: Minolta Co., Ltd., Osaka, Japan

[21] Appl. No.: 08/639,058

[22] Filed: Apr. 24, 1996

[30] Foreign Application Priority Data

Apr. 24, 1995 [JP] Japan ................................. 7-098504

[51] Int. Cl.⁶ .......................... G03G 15/04; G03G 21/00
[52] U.S. Cl. .............................. 399/44; 347/131; 399/51; 399/96
[58] Field of Search .................. 399/4, 44, 51, 399/96, 97; 347/131, 134

[56] References Cited

U.S. PATENT DOCUMENTS

| | | | |
|---|---|---|---|
| 4,931,815 | 6/1990 | Sato et al. | 347/116 |
| 5,325,122 | 6/1994 | Hattori et al. | 347/131 |
| 5,450,211 | 9/1995 | Kanai et al. | 347/134 X |
| 5,473,415 | 12/1995 | Hayashi et al. | 399/44 |
| 5,504,588 | 4/1996 | Takeuchi et al. | 347/131 X |
| 5,513,012 | 4/1996 | Takeuchi et al. | 347/131 X |
| 5,561,743 | 10/1996 | Kanai et al. | 347/134 X |
| 5,596,444 | 1/1997 | Eguchi | 359/210 |

FOREIGN PATENT DOCUMENTS

| | | |
|---|---|---|
| 2-264978 | 10/1990 | Japan . |
| 4-255816 | 9/1992 | Japan . |
| 6-55771 | 1/1998 | Japan . |

*Primary Examiner*—Fred L Braun
*Attorney, Agent, or Firm*—McDermott, Will & Emery

[57] ABSTRACT

The temperature and humidity around a photoreceptor drum and the total number of copied sheets of the photoreceptor drum are detected. Data LDATA for setting the intensity of a laser beam and data BDATA for setting the beam diameter according to the detected results are provided from an image control circuit to a laser drive circuit and a collimator lens drive circuit. The laser drive circuit corrects the intensity of the laser beam output from an LD package according to LDATA, and the collimator lens drive circuit controls the position of the collimator lens according to BDATA to correct the beam diameter of the laser beam.

42 Claims, 10 Drawing Sheets

FIG.3

| B DATA | 000 | 111 | 110 | 101 | 100 | 011 | 010 | 001 |
|---|---|---|---|---|---|---|---|---|
| BEAM DIAMETER DIMENSION ($\mu$m) | 0 | 30 | 35 | 40 | 45 | 50 | 55 | 60 |

FIG.4

| L DATA | 000 | 111 | 110 | 101 | 100 | 011 | 010 | 001 |
|---|---|---|---|---|---|---|---|---|
| MAXIMUM QUANTITY OF LIGHT (mW) | 0 | 0.6 | 0.8 | 1.0 | 1.2 | 1.4 | 1.6 | 1.8 |

IMAGE FORMING APPARATUS HAVING CIRCUITS FOR ADJUSTING LIGHT BEAM INTENSITY AND DIAMETER

BACKGROUND OF THE INVENTION

1. Field of the Invention

The present invention relates to image forming apparatuses, and more particularly, to an image forming apparatus that produces a predetermined image by exposing a photoreceptor using a laser beam.

2. Description of the Background Art

In an image forming apparatus such as a digital copier or a digital printer, a predetermined image is printed on a sheet of paper by exposing a uniformly-charged photoreceptor with a laser beam modulated by image data, developing the obtained electrostatic latent image with toner, and transferring this toner image onto a sheet.

The sensitivity of the photoreceptor used in the above-described image forming apparatus varies in response to temperature and sensitivity deterioration corresponding to the life time of the photoreceptor. Also, the ratio of the amount of toner transferred on a sheet to the amount of toner adhering on the photoreceptor by development (referred to as "transfer efficiency" hereinafter) varies according to humidity.

Decline in the temperature of the photoreceptor causes the surface potential of the photoreceptor to be less easily reduced to result in difficulty of adherence of the toner (i.e. concentration is reduced) even when the photoreceptor is exposed by an amount of exposure identical to that prior to temperature decline. Similarly, the surface potential is less easily reduced to prevent the toner from being readily attached as the life time of the photoreceptor comes near its end. Furthermore, there is a possibility of causing transfer inferiority depending upon the humidity in the vicinity of the transfer device.

An image forming apparatus directed to improve black line jitter, base smudge, 1-dot reproducibility, and resolution by detecting the surface potential of the photoreceptor and correcting the intensity of the laser beam according to the detected value is disclosed in Japanese Patent Laying-Open No. 2-264978.

The energy distribution of the laser beam for exposing the photoreceptor exhibits a Gaussian distribution. It is known that the shape of the distribution is always a similar figure regardless of the intensity of the laser. This means that the half-width of the laser beam does not change even when the intensity of the laser beam is varied. The half-width refers to the width of ½ the peak of the Gaussian distribution curve of the laser beam. The photosensitivity correction system of the above-described photoreceptor including a latent image is shown in FIG. 11. More specifically, FIG. 11 shows the relationship between the surface potential of the photoreceptor and the amount of exposure according to variation in the sensitivity characteristics. Also, the energy distribution in the subscanning direction of the laser beam and the configuration of the latent image in the subscanning direction are shown for the standard time and for the corrected time when the sensitivity characteristics of the photoreceptor changes.

Referring to FIG. 11, let the energy at the peak of the energy distribution of the laser beam for the standard time be $E_{11}$, $E_{12}$ (=$E_{12}/2$). The configuration of the energy distribution exhibits a Gaussian distribution. When the sensitivity characteristic is altered from C of the standard time to C', decline in the surface potential in forming a latent image becomes smaller. Therefore, the intensity of the laser beam is corrected to compensate for this effect (so that the level of the potential decline is equal to that prior to change in sensitivity). more specifically, $E_{11}$, is set to be $E_{21}$. Assuming that $E_{22}=E_{21}/2$, the beam diameter of the laser at the standard time of $E_{12}$ coincides with the beam diameter (shown in d in FIG. 11) of the laser at correction of $E_{22}$ since the laser distribution is similar figures regardless of the intensity of laser beam.

When a development bias $V_B$ equal to the surface potential of the photoreceptor irradiated with the exposure amount of $E_{12}$ is applied to the photoreceptor under the sensitivity characteristic of C for the standard time, development at the standard time and at the correction time is carried out in the respective shaded regions in FIG. 11. Therefore, the dimension of 1 dot (dot diameter) when a latent image is represented as an image changes from $d_1$, of the standard time to $d_2$ of the correction time to result in a greater dot diameter. Accordingly, the area of the shaded region in FIG. 11 becomes larger to increase the amount of toner adherence. Thus, there was a problem that merely a correction of the surface potential of the photoreceptor by means of correcting the intensity of the laser beam will cause increase in the dot diameter after the correction to increase the amount of toner adherence. Thus, an image of favorable quality could not be obtained.

An image forming apparatus that detects the surface potential of the photoreceptor or the concentration of the toner image, and that corrects only the beam diameter of the laser according to the detected result to compensate for the tone characteristics is disclosed in U.S. Pat. No. 5,325,122.

SUMMARY OF THE INVENTION

In view of the foregoing, an object of the present invention is to provide an image forming apparatus that can always form a favorable image irrespective of change in the sensitivity of the photoreceptor.

Another object of the present invention is to provide an image forming apparatus wherein the size of 1 dot does not change when the latent image is represented as an image, irrespective of the life time of the photoreceptor and variation in the temperature and humidity around the photoreceptor.

To achieve the above objects, an image forming apparatus according to an aspect of the present invention includes a photoreceptor, a laser beam emitting unit for exposing the photoreceptor, a detector for detecting change in the sensitivity of the photoreceptor, a first adjusting circuit for adjusting the emission intensity of a laser beam emitted from the laser beam emitting unit according to the photoreceptor sensitivity detected by the detector, and a second adjusting circuit for adjusting the beam diameter of the laser beam according to the emission intensity of the laser beam.

According to another aspect of the present invention, an image forming apparatus includes a photoreceptor, a laser beam emitting unit for exposing the photoreceptor to form an electrostatic latent image on the photoreceptor, a development unit for developing the electrostatic latent image formed on the photoreceptor by the laser beam with toner, a detector for detecting the sensitivity characteristic of the photoreceptor, a first adjusting circuit for adjusting the emission intensity of the laser beam output from the laser beam emitting unit according to the photoreceptor sensitivity detected by the detector so that the state of the electrostatic latent image is always identical regardless of the sensitivity of the photoreceptor, and a second adjusting circuit for adjusting the beam diameter of the laser beam according to the emission intensity of the laser beam adjusted by the first adjusting circuit so that the dot diameter of the electrostatic latent image developed by the development unit does not change.

According to a further aspect of the present invention, an image forming apparatus includes a laser beam emitting unit for exposing a photoreceptor, a development unit for developing an electrostatic latent image formed on the photoreceptor by a laser beam with a toner, a transfer member for transferring the developed toner image onto a sheet, a humidity detect sensor for detecting the humidity around the transfer member arranged in the proximity of the transfer member, and an adjusting unit for adjusting the beam diameter of a laser beam emitted from a laser beam emitting unit according to the humidity detected by the humidity detect sensor.

According to the present invention, the emission intensity of the laser beam is adjusted according to the sensitivity of the photoreceptor, and the beam diameter of the laser beam is adjusted according to the emission intensity of the laser beam.

Therefore, the photoreceptor can be exposed with a laser beam of optimum emission intensity and beam diameter.

According to the present invention, variation in the transfer efficiency caused by change in humidity can be prevented since the beam diameter is corrected according to the humidity around the transfer member.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows the relationship between BDATA and beam diameter.

FIG. 4 shows the relationship between LDATA and the maximum quantity of light of a laser beam.

DESCRIPTION OF THE PREFERRED EMBODIMENTS

A digital copying machine which is an image forming apparatus according to an embodiment of the present invention will be described hereinafter with reference to the drawings. Although a digital copying machine is taken as an example in the following embodiment, the present invention can be applied to other types of image forming apparatuses such as a digital printer.

Figure 1:
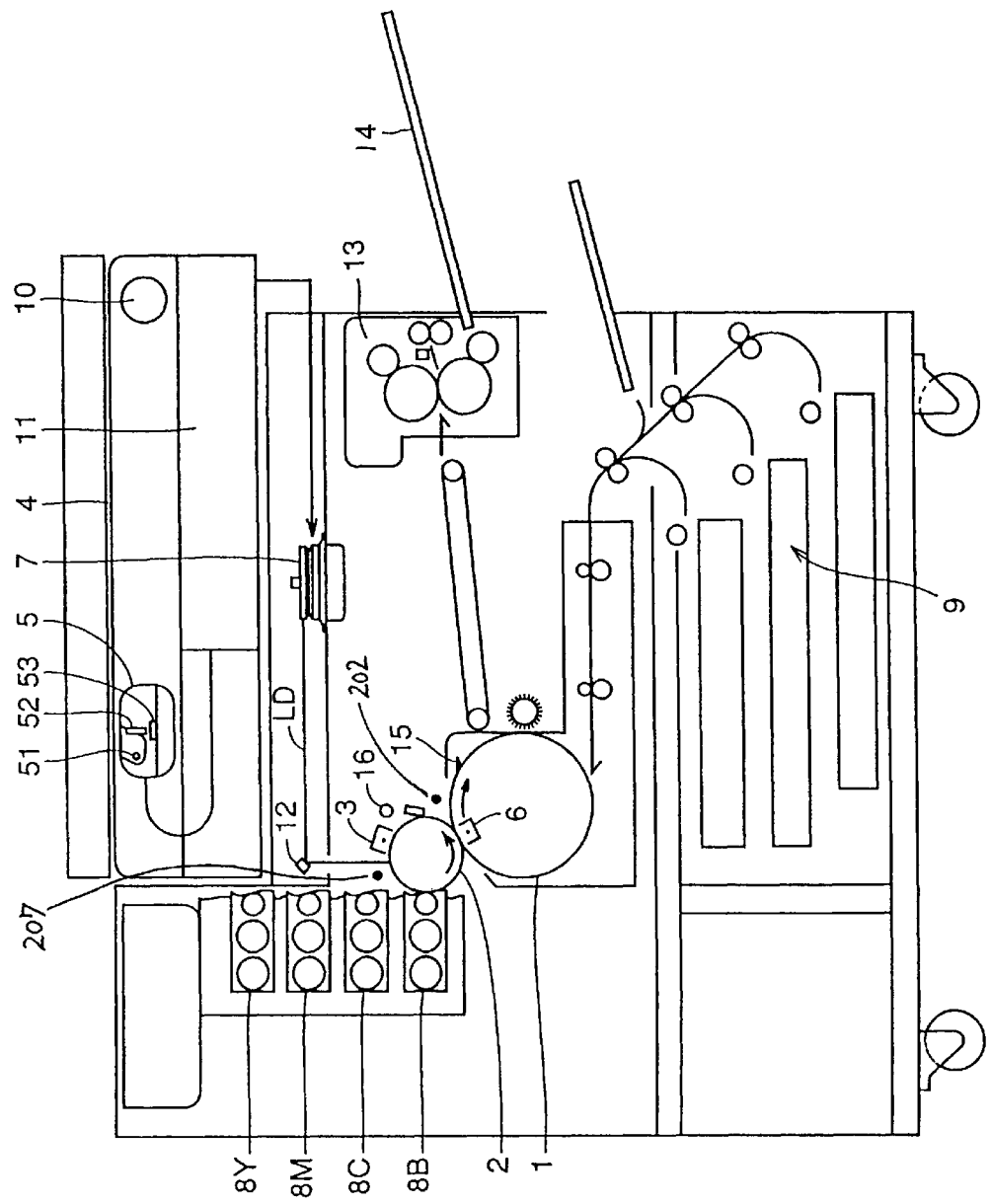
FIG. 1 shows an entire structure of a digital copying machine according to an embodiment of the present invention.

Referring to FIG. 1, a digital copying machine includes a transfer drum 1, a photoreceptor drum 2, a corona charger 3, a platen 4, a scanner 5, a transfer charger 6, a printer head unit 7, developers 8Y, 8M, 8C, and 8B, a sheet feed cassette 9, a motor 10, a signal processing unit 11, a reflecting mirror 12, a fixing device 13, a discharge tray 14, a chuck claw 15, and an eraser lamp 16. Scanner 5 includes an exposure lamp 51, a rod lens array 52, and an image sensor 53.

Scanner 5 is driven by motor 10 in reading an image of an original to scan over the original on platen 4. Here, the original is irradiated with the light of exposure lamp 51. The light reflected from the original is gathered by rod lens array 52. The gathered reflected light is converted into electrical signals by a color image sensor 53 formed of a contact CCD (Charge Coupled Device).

Signal processing unit 11 converts an electrical signal photoelectric-converted by image sensor 53 into an image signal of any color of yellow, magenta, cyan, or black. Printer head unit 7 provides a laser beam LD according to an image signal of each color provided from signal processing unit 11. Laser beam LD converted into scan light by printer head unit 7 is reflected by reflecting mirror 12 to expose photoreceptor drum 2.

Photoreceptor drum 2 has the surface charged uniformly by corona charger 3. An electrostatic latent image is formed on photoreceptor drum 2 by exposure of laser beam LD. This electrostatic latent image is developed by a predetermined color using any of developer 8Y for yellow, developer 8M for magenta, developer 8C for cyan, or developer 8B for black. The developed image is transferred onto a copy sheet wrapped around the circumference of transfer drum 1 by transfer charger 6.

After the above-described process is repeated for at least one color of yellow, magenta, cyan or black, the chuck claw 15 is opened, whereby the sheet is detached from transfer drum 1. The detached sheet is subjected to a fixing process by fixing device 13, and then delivered to discharge tray 14. During the above-described operation, scanner 5 repeats the scanning operation in synchronization with the rotation of photoreceptor drum 2 and transfer drum 1. The copy sheet is fed from feed cassette 9. The leading edge of the sheet is clamped by chuck claw provided at transfer drum 1 to prevent offset in position during the transfer process of respective colors. Also, eraser lamp 16 is provided.

Printer head unit 7 of FIG. 1 will be described in detail with reference to FIG. 2.

Figure 2:
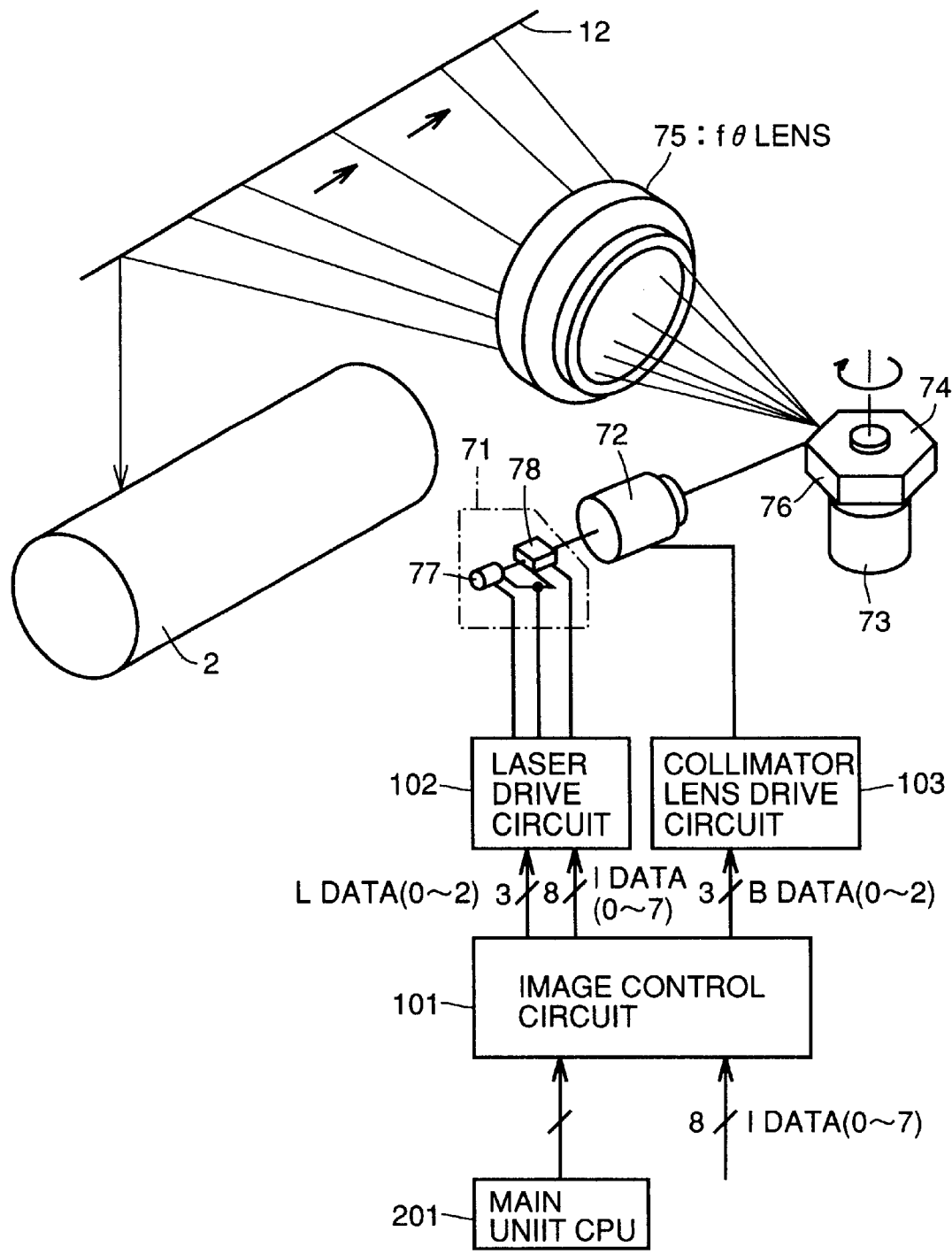
FIG. 2 shows a structure of the printer head unit of FIG. 1.

Referring to FIG. 2, printer head unit 7 includes an LD package 71 with a laser diode 78 for emitting a laser beam and a pin diode 77 connected thereto, a collimator lens 72 for modifying the beam diameter of the laser beam output from LD package 71, a polygon mirror 74 for polarizing the laser beam output from collimator lens 72, and a polygon motor 73 for driving polygon mirror 74 rotatably.

Polygon mirror 74 has a plurality of mirror faces to be rotated in the direction of the arrow in FIG. 2 by polygon motor 73. The laser beam polarized by polygon mirror 74 passes through fθ lens 75 to form an electrostatic latent image on photoreceptor drum 2 according to image data that will be described afterwards.

The drive circuits of the above printer head unit will be described hereinafter. The drive circuit of printer head unit 7 includes an image control circuit 101, a laser drive circuit 102, and a collimator lens drive circuit 103. Image control circuit 101 receives various control signals output from a CPU 201 for controlling the main unit, and image data IDATA (0–7) provided from signal processing unit 11. According to these input signals, image control circuit 101 provides image data IDATA (0–7) for modulating the intensity of the laser beam and data LDATA (0–2) for changing the maximum quantity of light of the laser beam to laser drive circuit 102. IDATA is data of 256 tones (0–255) that can be represented by 8 bits. The maximum quantity of light of the laser beam is accorded the maximum value (255) of IDATA. As to the minimum value (0) of IDATA, no laser beam is emitted. As to the intermediate value (128) of IDATA, half the amount of the maximum quantity of light of the laser beam is assigned. Thus, the quantity of light of the laser beam is assigned of a predetermined range of 256 tones of IDATA.

Image control circuit 101 provides data BDATA (0–2) for modifying the beam diameter of the laser beam to collimator lens drive circuit 103.

Referring to FIG. 3, BDATA is data of 3 bits. A predetermined beam diameter is assigned in advance to each data. For example, the beam diameter is 30 μm for BDATA=111. Referring to FIG. 4, LDATA is data of 3 bits. The maximum quantity of light of a predetermined laser beam is assigned in advance to each data. For example, the maximum quantity of light is 0.6 mW when LDATA=111. Collimator lens drive circuit 103 controls the beam diameter of the laser beam by driving collimator lens 72 according to the value of BDATA (0–2). Laser drive circuit 102 controls the maximum quantity of light of the laser beam according to the value of LDATA (0–2).

Figure 5:
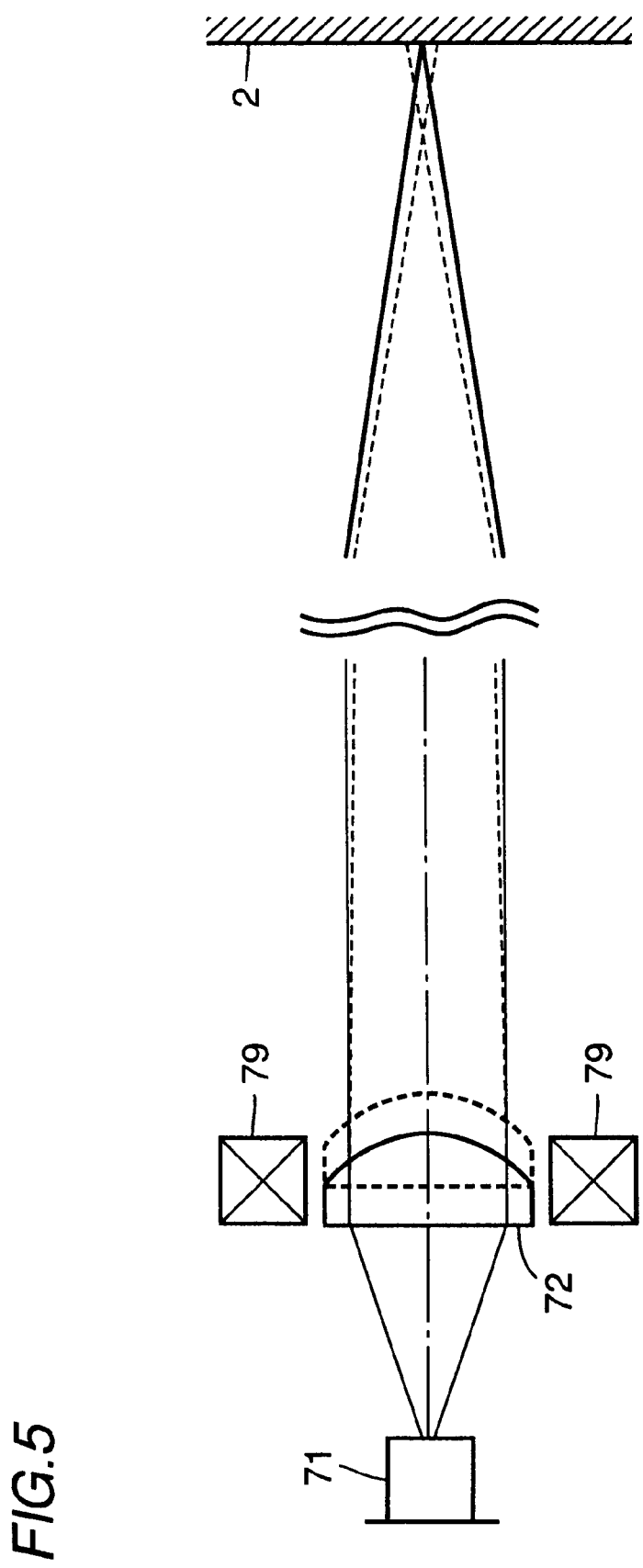
FIG. 5 shows a mechanism for altering the beam diameter of a laser beam.

The mechanism for modifying the beam diameter of the laser beam will be described hereinafter. Referring to FIG. 5, collimator lens 72 is shifted in the direction of the optical axis by a voice coil 79. A drive mechanism for controlling the focus in a pickup apparatus of an optical disk drive can be adapted for this shift mechanism.

When collimator lens 72 is located at the position indicated by the solid line in FIG. 5, the laser beam is set to exhibit a minimum beam diameter of $D_0$ on photoreceptor drum 2. As collimator lens 72 is shifted by $\Delta x$ to the position indicated by the dotted line by voice coil 79, defocus occurs on photoreceptor drum 2 to result in a greater beam diameter. Here, the beam diameter D is represented as:

$$D(\Delta x)=D_0[1+\{4\lambda(f/f_{co})^2\Delta x/\pi D_0^2\}^2]^{1/2}$$

where $\lambda$ is the oscillation wavelength of the laser diode, f the focal length of the scanning optical system (fθ lens), and $f_{co}$ the focal length of collimator lens 72.

Assuming that:

$\lambda$=780 nm, f=150 mm, $f_{co}$=6.0 mm, and $D_0$=30 μm,
the following is obtained:

$$D=0.03\ (1+4.76\times10^5\cdot\Delta x^2)^{1/2}(\text{mm})$$

By shifting collimator lens 72 in the direction of the optical axis by the driving mechanism of a moving coil type, the beam diameter can be adjusted to an arbitrary value in the range of 30 μm–60 μm.

Figure 6:
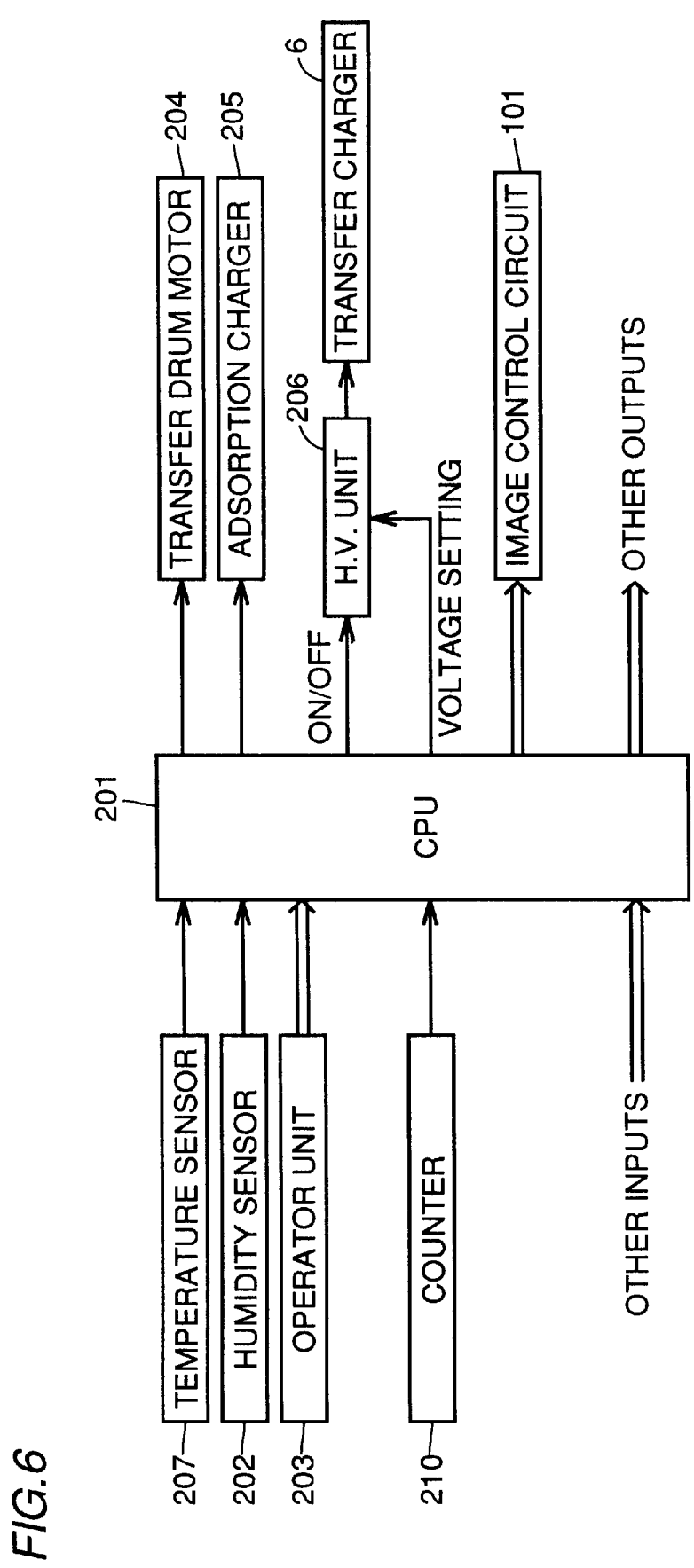
FIG. 6 is a block diagram for describing input/output of a CPU for controlling the main unit.

Input/output signals of CPU 201 for controlling the main unit will be described with reference to the block diagram of FIG. 6. Referring to FIG. 6, CPU 201 receives from an operator unit 203 a start signal for initiating image formation, a signal of an image forming mode that designates the number of transfers, and a signal for selecting the type of the transfer sheet. Furthermore, the detected values of the temperature and humidity from temperature sensor 207 and humidity sensor 202 are also applied. Since the life time of the photoreceptor drum is substantially proportional to the accumulated number of rotation of the photoreceptor drum, the life time of the photoreceptor drum can be detected from the value of the accumulated number of rotation of the photoreceptor. However, in the present embodiment, the total number of copy sheets that are printed and output is counted by a counter 210 instead of counting the accumulated number of rotation to identify the life time of the photoreceptor. The count value (total number of printed sheets) of counter 210 is applied to CPU 201.

CPU 201 provides various signals set forth in the following according to the above-described input signals. ON or OFF signals for a transfer drum motor 204 and a adsorption charger 205, as well as ON or OFF signals and voltage set signals for transfer charger 6 are provided. In FIG. 6, reference number 206 refers to a boost drive circuit (H.V. unit) of transfer charger 6. CPU 201 communicates with image control circuit 101 to transmit signals indicating the set value of the maximum quantity of light of the laser beam and also the set value of the beam diameter of the laser beam according to flow charts that will be described afterwards.

Figure 7:
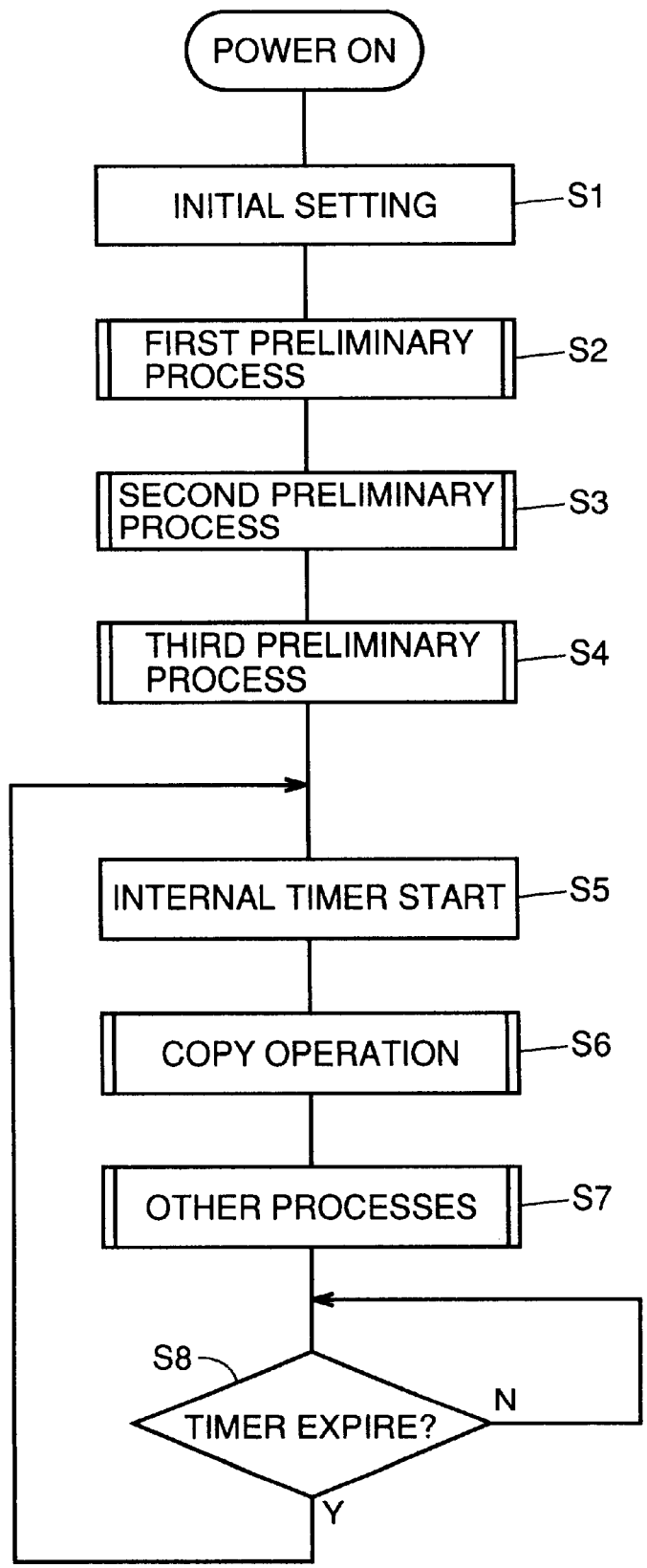
FIG. 7 is a flow chart for describing the main process of the CPU for controlling the main unit.

An operation of CPU 201 will be described with reference to the flow chart of FIG. 7. When the power of the main unit of the image forming apparatus is turned on, an initialization process such as resetting various flags and setting the initial mode is carried out at step S1. Then at steps S2–S4, processes for correcting the laser beam according to change in sensitivity of the photoreceptor drum are effected. At step S5, an internal timer for defining the processing time period of the main process is initiated. At step S6, a copy operation is effected. This copy operation is similar to that of a general digital copier, and detailed description will not be provided herein. At step S7, processes other than the copy operation such as key input process, a panel display process, and a communication process with another CPU are effected. Finally at step S8, determination is made whether the internal timer set at step S5 has expired or not. If the timer has not yet expired, step S8 is repeated, otherwise the control proceeds to step S5 to continue the subsequent process.

Figure 8:
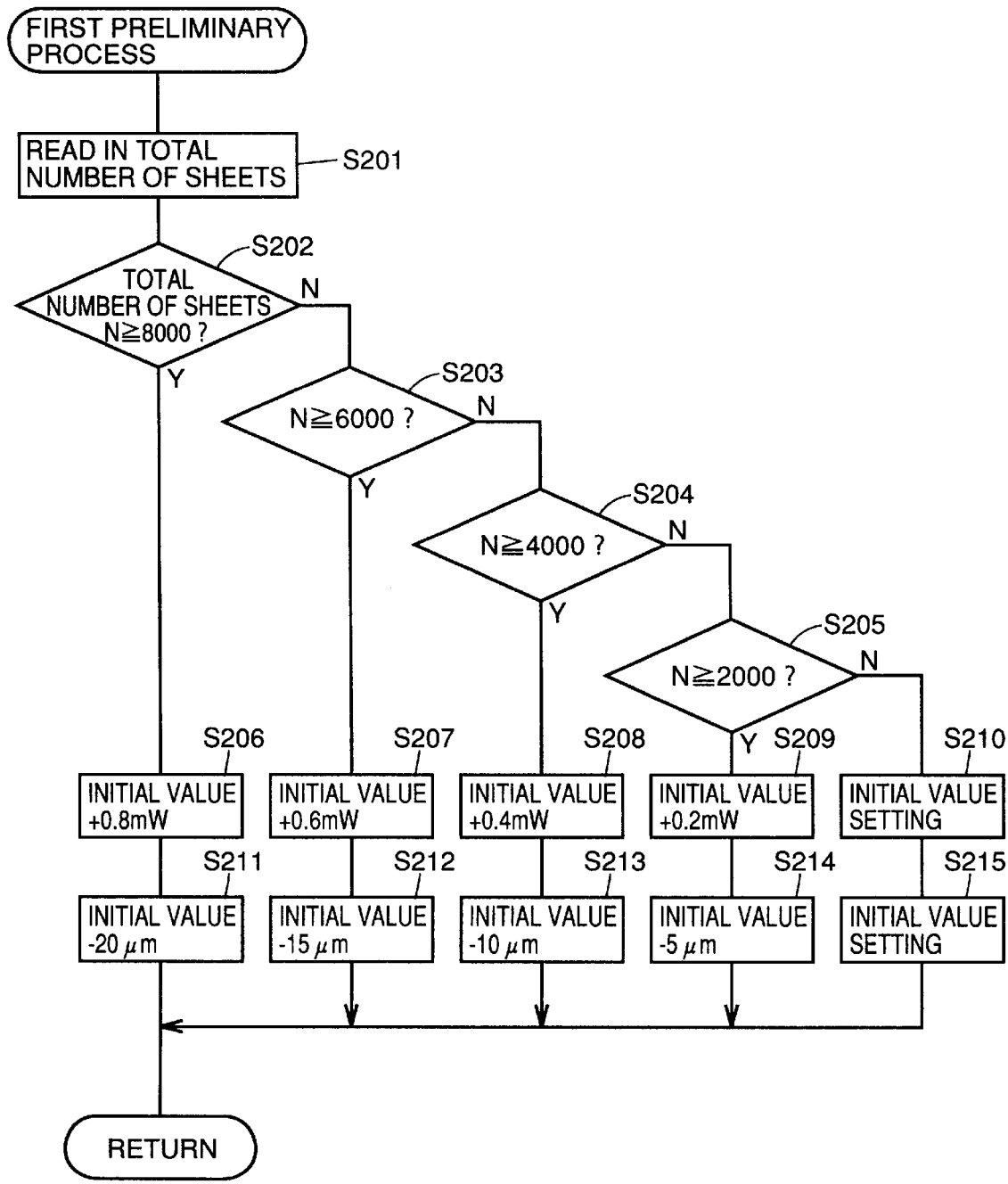
FIGS. 8, 9 and 10 are flow charts for describing the first preliminary process, second preliminary process, and third preliminary process, respectively, shown in FIG. 7.

The first to third preliminary processes of FIG. 7 will be described with reference to respective flow charts of FIGS. 8–10. In the first preliminary process of FIG. 8, change in sensitivity of the photoreceptor drum according to the total amount of printed sheets corresponding to the life time of the photoreceptor is estimated to correct the intensity (maximum quantity of light) of the laser beam together with the beam diameter thereof.

At step S201, a count value N of the total number of sheets is entered. At steps S202–S205, the count value N is compared with a predetermined preset value respectively (for example, 8000 sheets, 6000 sheets, 4000 sheets, 2000 sheets). According to the compared result, the intensity of the laser beam is corrected at respective steps of S206–S210. Furthermore, the beam diameter of the laser beam is corrected according to the intensity of the laser beam set at steps S211–S215.

For example, if the count value N of the total number of sheets exceeds 8000 sheets, the intensity of the laser beam is corrected to a value of an initial value plus 0.8 mV at step S206. At step S211, the diameter of the laser beam is corrected to a value of an initial value minus 20 μm. At steps S210 and S215, the photoreceptor drum is determined to be a new one, and a predetermined initial intensity and initial beam diameter specified in advance are set.

Figure 9:
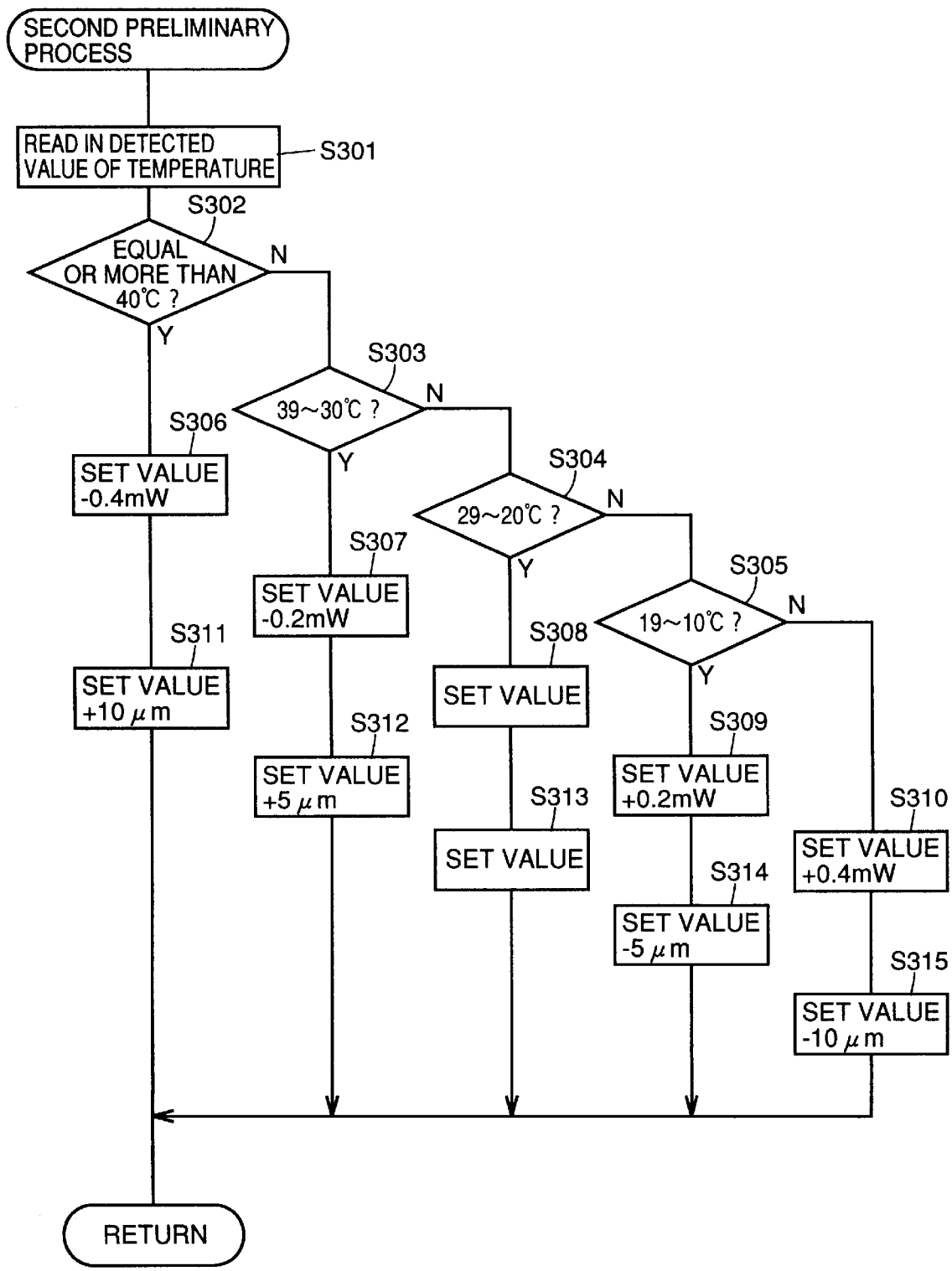

In the second preliminary process of FIG. 9, the ambient temperature of photoreceptor drum 2 is detected by temperature sensor 207. The intensity and the beam diameter of laser beam are corrected according to the detected temperature.

At step S301, a detected value of temperature is read in from temperature sensor 207. Temperature sensor 207 is provided in the vicinity of photoreceptor drum 2. At steps S302–S305, the detected value of temperature is compared with a predetermined temperature range to determine which temperature range it belongs to. Then, the intensity of the laser beam is corrected on the basis of a predetermined set value at steps S306–S310 according to the determination results in steps S302–S305. For example, when the detected value of temperature is within the range of 29–20° C., the current set value of the intensity of the laser beam at step S308 is directly used. If the detected value of temperature exceeds 40° C., a value of a set value minus 0.4 mV is set as the intensity of the laser beam at step S306. The beam diameter can be reduced so as to match that of the standard time according to the above-described first and second preliminary processes even when the intensity of the laser beam is increased by correction.

At steps S311–S315, the beam diameter of the laser is corrected on the basis of a predetermined set value according to the intensity of the laser beam set in steps S306–S310. For example, the diameter of the laser beam is designated as the set value in step S313, and a value of 10 $\mu$m added to the current set value is specified as the set value in step S311.

Figure 10:
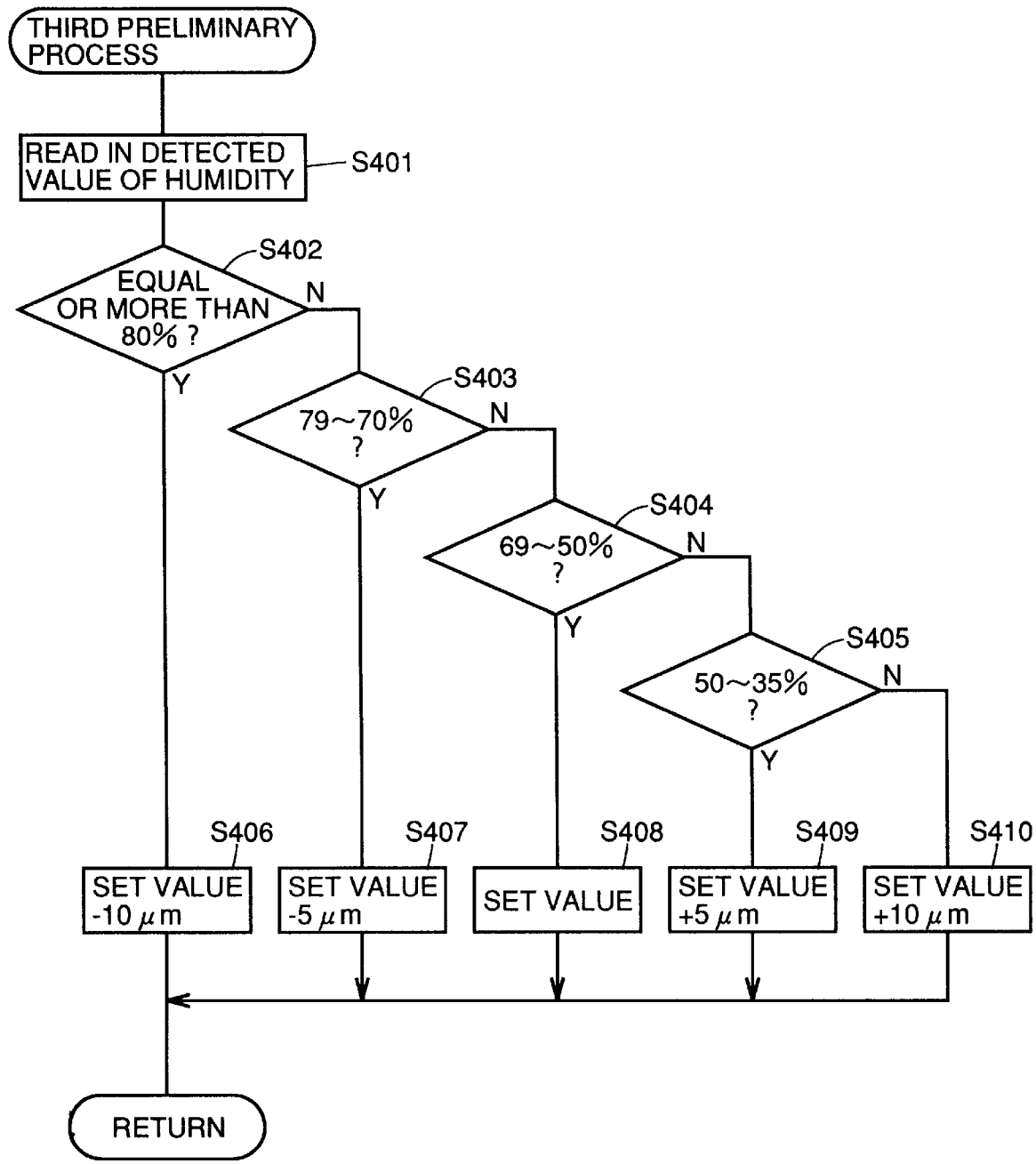
Figure 11:
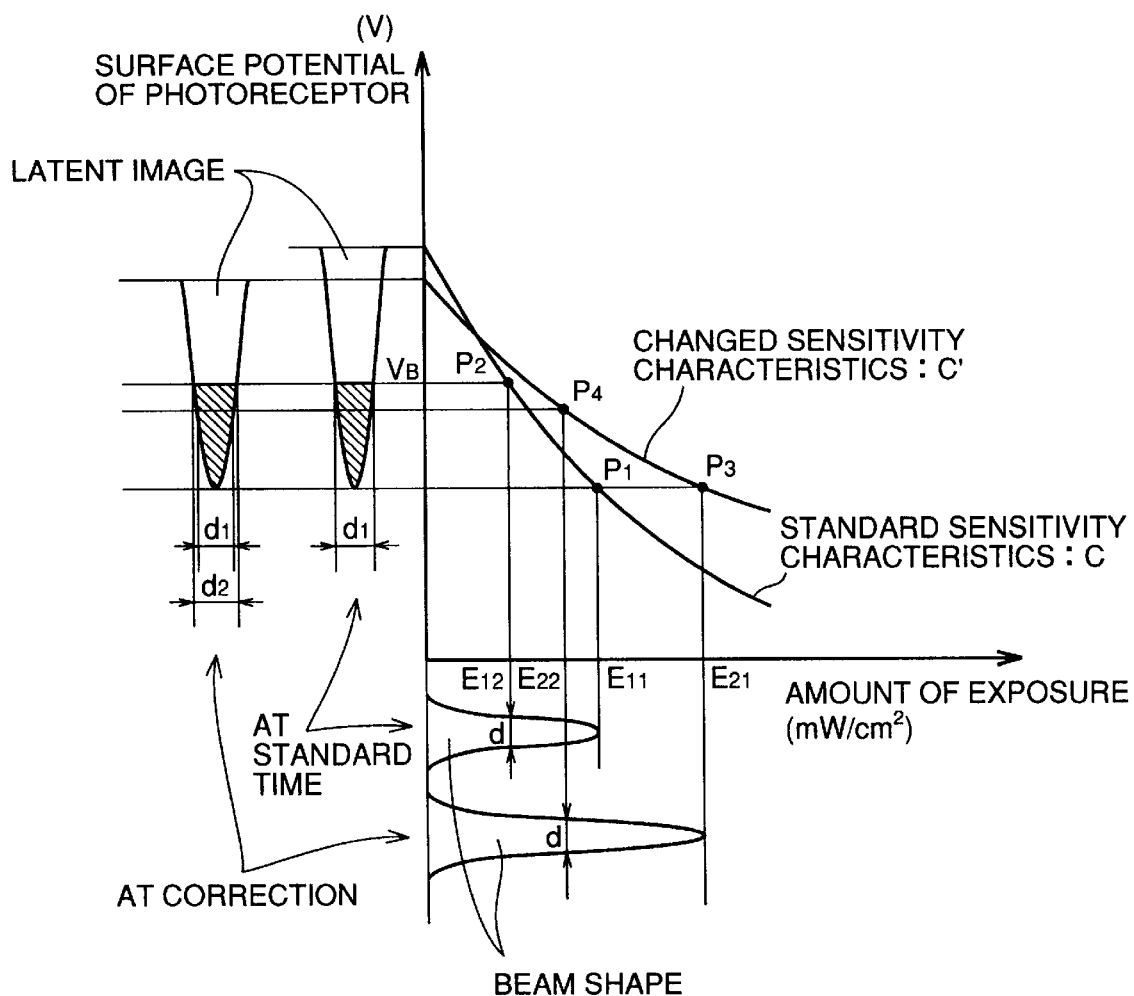
FIG. 11 shows the relationship between the surface potential and the amount of exposure of the photoreceptor according to change in sensitivity characteristics.

In the third preliminary process of FIG. 10, the beam diameter of the laser is corrected according to the humidity detected by humidity sensor 202 located in the vicinity of transfer drum 1 since the transfer efficiency changes depending on the humidity around transfer drum 1.

At step S401, the humidity in the proximity of transfer drum 1 is detected and read in as the detected value of humidity. At steps S402–S405, the detected value of humidity is compared with a predetermined humidity range set in advance to determine which humidity range it belongs to. Then at steps S406–410, the diameter of the laser beam is set according to the range of humidity to which the detected value of humidity belongs. For example, when the detected value of humidity is in the range of 69–50%, the beam diameter of the laser beam is set by the current set value at step S408. When the detected value of humidity exceeds 80%, a value of the current set value minus 10 $\mu$m is set as the beam diameter of the laser beam in step S406. Even if the transfer efficiency is degraded due to change in the humidity, the above-described third preliminary process allows a greater beam diameter to increase the amount of toner attachment. Therefore, reduction in the concentration of the copy can be prevented. In this case, the amplitude of the output of transfer charger 6 is reduced to be suitable to lower the cost.

According to the above-described first to third preliminary processes, the intensity and the diameter of the laser beam can be set to optimum values corresponding to the life time of the photoreceptor drum, the temperature around the photoreceptor drum and the humidity around the transfer drum. Therefore, an image of favorable quality can be always output irrespective of change in the sensitivity of the photoreceptor.

It is to be noted that not at all the first to third preliminary processes have to be carried out. Only an arbitrary process may be effected. Furthermore, by rendering the output of transfer charger 6 variable, the amount of correction of the beam diameter can be reduced than the case where correction is carried out only by the beam diameter.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:

a photoreceptor, a laser beam emitting unit for exposing said photoreceptor, a detector for detecting sensitivity of said photoreceptor, first adjusting means for adjusting intensity of a laser beam emitted from said laser beam emitting unit according to the sensitivity of said photoreceptor detected by said detector, and second adjusting means for adjusting a beam diameter of the laser beam according to the intensity of the laser beam.

2. The image forming apparatus according to claim 1, wherein said detector includes a temperature sensor for detecting temperature of said photoreceptor, and said first adjusting means further adjusts the intensity of said laser beam according to the detected temperature of said photoreceptor.

3. The image forming apparatus according to claim 2, wherein the temperature of said photoreceptor is classified into a plurality of predetermined ranges, and a correction value of intensity of said laser beam is stored for every predetermined range of temperature.

4. The image forming apparatus according to claim 3, wherein said first adjusting means adjusts the intensity of said laser beam according to a correction value of a temperature range to which the temperature of the photoreceptor detected by said temperature sensor belongs.

5. The image forming apparatus according to claim 2, wherein said detector includes a humidity sensor for detecting humidity in the proximity of said photoreceptor, and said first adjusting means further adjusts the beam diameter of said laser beam according to the detected humidity by said humidity sensor.

6. The image forming apparatus according to claim 5, wherein the humidity in the proximity of said photoreceptor is classified into a plurality of predetermined ranges, and a correction value of diameter of said laser beam is stored for every predetermined range of humidity.

7. The image forming apparatus according to claim 1, wherein said detector is a counter for counting a total number of printed out sheets, and said first adjusting means adjusts the intensity of said laser beam according to a count value.

8. The image forming apparatus according to claim 7, wherein said count value is classified into a plurality of predetermined ranges, and a correction value of intensity of said laser beam is stored for every predetermined range of count value.

9. The image forming apparatus according to claim 8, wherein said first adjusting means adjusts intensity of said laser beam according to a correction value of a range to which the count value detected by said counter belongs.

10. The image forming apparatus according to claim 7, wherein said detector includes a humidity sensor for detecting humidity in the proximity of said photoreceptor, and said first adjusting means further adjusts the beam diameter of said laser beam according to the detected humidity by said humidity sensor.

11. The image forming apparatus according to claim 10, wherein the humidity in the proximity of said photoreceptor is classified into a plurality of predetermined ranges, and a correction value of diameter of said laser beam is stored for every predetermined range of humidity.

12. The image forming apparatus according to claim 1, wherein said laser beam emitting unit comprises a voice coil and a collimator lens, and the beam diameter of said laser beam is adjusted by shifting said collimator lens in a direction of an optical axis of said laser beam by said voice coil.

13. The image forming apparatus according to claim 1, wherein said second adjusting means adjusts the beam diameter so that the beam diameter is in inverse proportion to the intensity of the laser beam.

14. The image forming apparatus according to claim 1, wherein said second adjusting means adjusts the beam diameter so as to reduce the beam diameter according to an increase of the intensity of the laser beam.

15. The image forming apparatus according to claim 1, wherein said second adjusting means adjusts the beam diameter so as to reduce the beam diameter according to a sensitivity deterioration of the photoreceptor.

16. The image forming apparatus according to claim 1, wherein said detector detects a value of an accumulated number of rotations of the photoreceptor, and said first adjusting means adjusts the intensity of said laser beam according to the value.

17. An image forming apparatus comprising:

a photoreceptor, a laser beam emitting unit for exposing said photoreceptor, and forming an electrostatic latent image on said photoreceptor, development means for developing said electrostatic latent image formed on said photoreceptor by a laser beam with toner, a detector for detecting sensitivity of said photoreceptor, first adjusting means for adjusting intensity of a laser beam emitted from said laser beam emitting unit according to the sensitivity of said photoreceptor detected by said detector so that status of said electrostatic latent image is always identical irrespective of the sensitivity of said photoreceptor, and second adjusting means for adjusting a beam diameter of the laser beam so that the dot diameter does not change in developing the formed electrostatic latent image with said development means according to the intensity of the laser beam adjusted by said first adjusting means.

18. The image forming apparatus according to claim 17, wherein said detector includes a temperature sensor for detecting temperature of said photoreceptor, and said first adjusting means further adjusts the intensity of said laser beam according to the detected temperature of said photoreceptor.

19. The image forming apparatus according to claim 18, wherein the temperature of said photoreceptor is classified into a plurality of predetermined ranges, and a correction value of intensity of said laser beam is stored for every predetermined range of temperature.

20. The image forming apparatus according to claim 19, wherein said first adjusting means adjusts the intensity of said laser beam according to a correction value of a temperature range to which the temperature of the photoreceptor detected by said temperature sensor belongs.

21. The image forming apparatus according to claim 18, wherein said detector includes a humidity sensor for detecting humidity in the proximity of said photoreceptor, and said first adjusting means further adjusts the beam diameter of said laser beam according to the detected humidity by said humidity sensor.

22. The image forming apparatus according to claim 21, wherein the humidity in the proximity of said photoreceptor is classified into a plurality of predetermined ranges, and a correction value of diameter of said laser beam is stored for every predetermined range of humidity.

23. The image forming apparatus according to claim 17, wherein said detector is a counter for counting a total number of printed out sheets, and said first adjusting means adjusts the intensity of said laser beam according to a count value.

24. The image forming apparatus according to claim 23, wherein said count value is classified into a plurality of predetermined ranges, and a correction value of intensity of said laser beam is stored for every predetermined range of count value.

25. The image forming apparatus according to claim 24, wherein said first adjusting means adjusts the intensity of said laser beam according to a correction value of a range to which the count value detected by said counter belongs.

26. The image forming apparatus according to claim 23, wherein said detector includes a humidity sensor for detecting humidity in the proximity of said photoreceptor, and said first adjusting means further adjusts the beam diameter of said laser beam according to the detected humidity by said humidity sensor.

27. The image forming apparatus according to claim 26, wherein the humidity in the proximity of said photoreceptor is classified into a plurality of predetermined ranges, and a correction value of diameter of said laser beam is stored for every predetermined range of humidity.

28. The image forming apparatus according to claim 17, wherein said laser beam emitting unit comprises a voice coil and a collimator lens, and the beam diameter of said laser beam is adjusted by shifting said collimator lens in a direction of an optical axis of said laser beam by said voice coil.

29. An image forming apparatus comprising:

a laser beam emitting unit for exposing a photoreceptor, development means for developing an electrostatic latent image formed on said photoreceptor by a laser beam with toner, a transfer member for transferring the developed toner image on a sheet, a humidity detection sensor disposed in the proximity of said transfer member for detecting humidity in the proximity of said transfer member, and adjusting means for adjusting a beam diameter of a laser beam emitted from said laser beam emitting unit according to the humidity detected by said humidity detection sensor without modifying intensity of the laser beam.

30. The image forming apparatus according to claim 29, wherein said laser beam emitting unit comprises a voice coil and a collimator lens, and said beam diameter of said laser beam is adjusted by shifting said collimator lens in a direction of an optical axis of said laser beam by said voice coil.

31. The image forming apparatus according to claim 29, wherein said adjusting means adjusts the beam diameter so as to reduce the beam diameter according to an increase of the detected humidity.

32. An image forming apparatus comprising:

a photoreceptor, a beam emitting unit for exposing said photoreceptor, a detector for detecting sensitivity of said photoreceptor, first adjusting means for adjusting intensity of a beam emitted from said beam emitting unit according to the sensitivity of said photoreceptor, and second adjusting means for adjusting a spot size of the beam according to the adjusted intensity of the beam.

33. The image forming apparatus according to claim 32, wherein said detector includes a temperature sensor for detecting temperature of said photoreceptor, and said first adjusting means further adjusts the intensity of said beam according to the detected temperature of said photoreceptor.

34. The image forming apparatus according to claim 32, wherein said detector is a counter for counting a total number of printed out sheets, and said first adjusting means adjusts the intensity of said beam according to a count value.

35. The image forming apparatus according to claim 32, wherein said detector includes a humidity sensor for detecting humidity in the proximity of said photoreceptor, and said first adjusting means further adjusts the beam diameter of said beam according to the detected humidity by said humidity sensor.

36. The image forming apparatus according to claim 32, wherein said detector detects a value of an accumulated number of rotations of the photoreceptor, and said first adjusting means adjusts the intensity of said beam according to the value.

37. An image forming apparatus comprising:

a photoreceptor, a beam emitting unit for exposing said photoreceptor, and forming an electrostatic latent image on the photoreceptor, wherein the beam profile exposing the photoreceptor is a dot, development means for developing said electrostatic latent image formed on said photoreceptor with toner, a detector for detecting sensitivity of said photoreceptor, first adjusting means for adjusting intensity of a beam emitted from said beam emitting unit according to the sensitivity of said photoreceptor so that status of said electrostatic latent image is always identical irrespective of the sensitivity of said photoreceptor, and second adjusting means for adjusting a spot size of the beam so that the dot diameter does not change in developing the formed electrostatic latent image with said development means according to the intensity of the beam adjusted by said first adjusting means.

38. The image forming apparatus according to claim 37, wherein said detector includes a temperature sensor for detecting temperature of said photoreceptor, and said first adjusting means further adjusts the intensity of said beam according to the detected temperature of said photoreceptor.

39. The image forming apparatus according to claim 37, wherein said detector is a counter for counting a total number of printed out sheets, and said first adjusting means adjusts the intensity of said beam according to a count value.

40. The image forming apparatus according to claim 39, wherein said detector includes a humidity sensor for detecting humidity in the proximity of said photoreceptor, and said first adjusting means further adjusts the beam diameter of said beam according to the detected humidity by said humidity sensor.

41. An image forming apparatus comprising:

a beam emitting unit for exposing a photoreceptor, development means for developing an electrostatic latent image formed on said photoreceptor by a beam with toner, a transfer member for transferring the developed toner image on a sheet, a humidity detection sensor disposed in the proximity of said transfer member for detecting humidity in the proximity of said transfer member, and adjusting means for adjusting a spot size of a beam emitted from said beam emitting unit according to the humidity detected by said humidity detection sensor without modifying intensity of the beam.

42. The image forming apparatus according to claim 41, wherein said adjusting means adjusts the spot size of the beam so as to reduce the spot size of the beam according to increase of the detected humidity.

* * * * *